May 9, 1961  E. M. COAN  2,983,556
LOW FRICTION BEARING
Filed Feb. 17, 1958  4 Sheets-Sheet 1
FIG. 1.
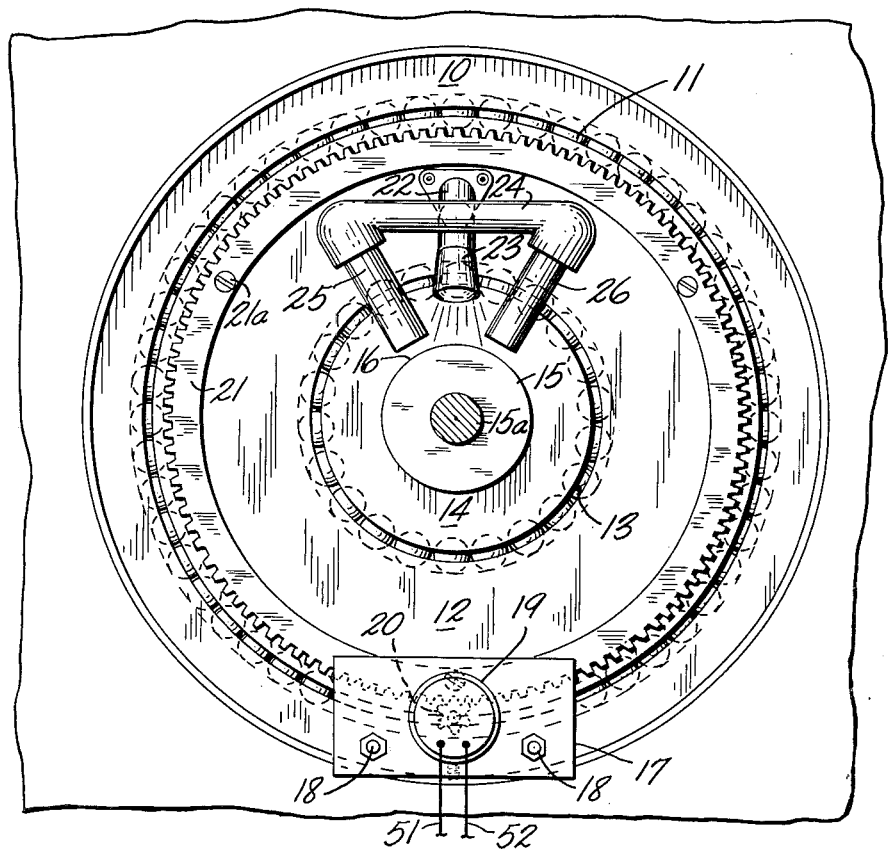
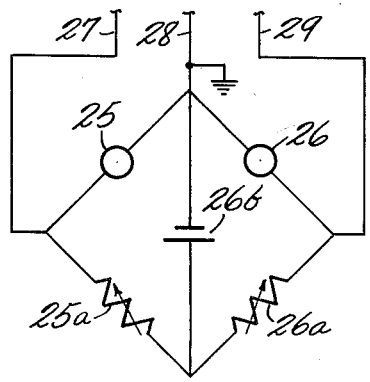
FIG. 2A.
INVENTOR.
EDWARD M. COAN
BY
Brumbaugh, Free, Graves + Donohue
his ATTORNEYS.

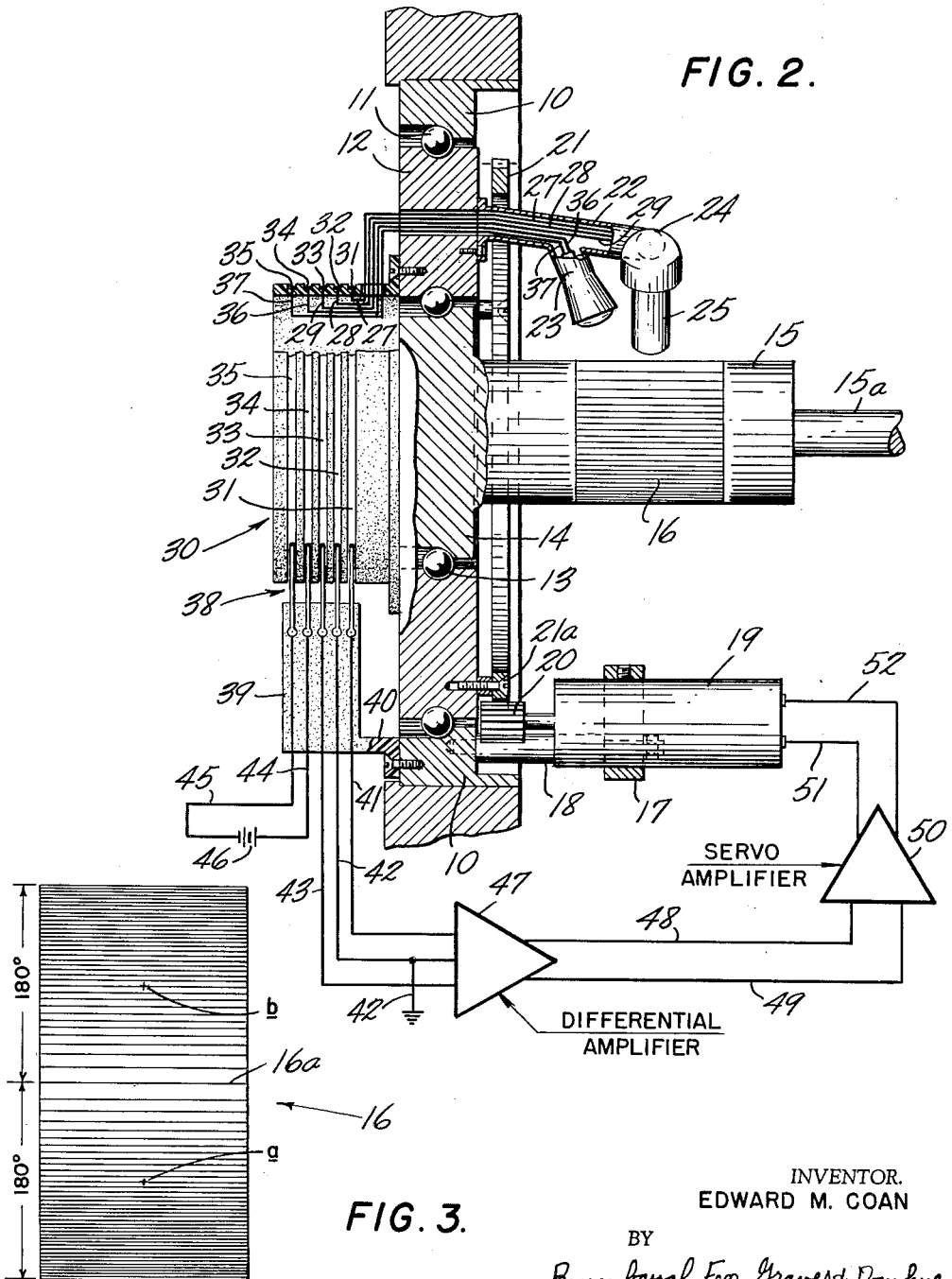

May 9, 1961    E. M. COAN    2,983,556
LOW FRICTION BEARING
Filed Feb. 17, 1958    4 Sheets-Sheet 4

INVENTOR.
EDWARD M. COAN
BY
Brumbaugh, Free, Graves + Donohue
his ATTORNEYS.

United States Patent Office 2,983,556
Patented May 9, 1961

2,983,556
LOW FRICTION BEARING

Edward M. Coan, Cedar Grove, N.J., assignor to Vitro Corporation of America, New York, N.Y.

Filed Feb. 17, 1958, Ser. No. 715,625

19 Claims. (Cl. 308—183)

This invention relates to an improved low friction bearing, and has particular reference to bearings with a minimum of dynamic and static friction losses.

Reducing bearing friction losses to a minimum is of great importance in a number of applications such, for example, as high precision instruments in which an indicator arm is displaced by a shaft journaled in suitable bearings, and a gyroscope journaled in low friction bearings.

It is well known that a bearing supported shaft is subject to dynamic friction losses resulting from the relative motion of the shaft and the bearing. Moreover, static friction losses are attributable to initial movement of the shaft in the bearing because friction between two surfaces is slightly greater just before motion begins than when the surfaces are in steady relative motion.

In order to reduce friction losses in bearings used in high precision equipments, the present invention supplies an external force, in accordance with the angular displacement between two relatively rotatable members journaled together, to one of the members to rotate it in a direction to minimize relative rotation between the members.

A further feature of the invention includes the provision of dithering movement of one of the relatively movable members to minimize static friction losses.

Another feature of the invention resides in the generation of a signal which, when furnished to driving elements, displaces the relatively rotatable members after movement thereof to compensate for the null width of the system supplying an external force to one of the members.

These and further advantages of the invention will be more readily understood when the following description is read in connection with the accompanying drawings in which:

Figure 1 is an elevation of a low friction bearing structure, absent certain control circuits, in accordance with the present invention;

Figure 2 is a partial longitudinal section of the low friction bearing of Figure 1 taken along the lines 2—2 looking in the direction of the arrows, and illustrating schematically the circuits omitted from Figure 1;

Figure 2A is a schematic circuit diagram of a circuit that may be used with photosensitive elements shown in Figure 2;

Figure 3 is an expanded view showing in detail one form of pattern that may be inscribed on the shaft of Figures 1 and 2;

Figure 4:
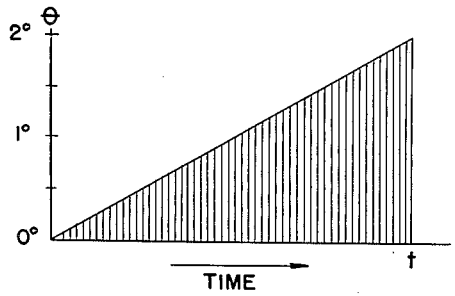
Figure 4 is a curve showing the amount of energy lost in a conventional bearing.

Referring to a typical embodiment of the invention in greater detail with particular reference to Figures 1 and 2, an outer grooved race 10, fastened to any desired support, carries a full circle of balls 11 held in position by an inner grooved race 12. Another circle of balls 13 is deposed between the race 12 and a central grooved race 14. A shaft 15, bearing indicia 16, may be formed with a smaller extension shaft 15a and attached to the central race 14.

A mounting frame 17, fastened by arms 18 to the outer race 10, supports a servo motor 19 from which extends a drive pinion 20. A spur ring gear 21 meshes with the pinion 20 and is affixed by screws 21a to the inner race 12.

An arm 22, also fastened to the inner race 12, supports a light source 23 and a housing 24 from which extend a pair of matched photosensitive elements 25 and 26 viewing the illuminated indicia 16 on the shaft 15. It should be understood that the cells 25 and 26 may be of the photoconductive type or the photovoltaic type that generate potentials representative of the light received thereby. For example, conventional phototransistors may be used as the light pickup elements 25 and 26.

Referring to Figure 2, conductors 27, 28 and 29 extend from a bridge circuit (Figure 2A) and are respectively connected to three rings 31 to 33 of a five segment slip ring 30. Conductors 36 and 37 carry electrical energy to the light source 23 and are joined to conductive rings 34 and 35, respectively, on the slip ring assembly 30.

Brushes 38, extending from a support member 39 attached by an arm 40 to the outer bearing race 10, electrically join the conductive rings 31 to 35 to conductors 41 to 45, respectively. A suitable source of potential, such as a battery 46, may be connected to the conductors 44 and 45 to supply energy to the light source 23 through the brushes 38, the rings 34 and 35, and the conductors 36 and 37.

The conductors 41 to 43 effectively connect the photosensitive elements 25 and 26 to the inputs of a conventional differential amplifier 47 grounded by the conductor 42. For example, amplifiers of the type described in the text "Vacuum Tube Amplifier," volume 18, Radiation Laboratory Series, published in 1948 by McGraw-Hill Book Company, Inc., pages 441 to 451 may be used as the differential amplifier 47. In particular, the circuit of Figs. 11–28 on page 446 of that text illustrates a useful circuit that may be adapted for use in the low friction bearing system.

With photoconductive devices such as phototransistors being used as the photosensitive elements 25 and 26, the bridge arrangement shown in Figure 2A may be incorporated in the support housing 24. The two balanced phototransistors form two adjacent arms of the bridge with their common junction grounded. A pair of adjustable resistors 25a and 26a complete the circuit. A D.-C. source 26b supplies energy through the bridge to the output conductors 27 and 29 balanced with respect to the grounded conductor 28.

If the photosensitive devices 25 and 26 comprise photovoltaic cells, a common junction may be grounded by the conductor 28, their remaining terminals being connected to the output conductors 27 and 29. With that arrangement, the bridge circuit would not be required.

Normally, the conductors 41 and 43 supply potentials of equal value with respect to the grounded conductor 42 and the amplifier 47 is adjusted to provide no output under those conditions. When the input voltages become unbalanced, the differential amplifier 47 generates an output signal of an amplitude reflecting the amount of unbalance and of a polarity representative of the sense of unbalance. Output conductors 48 and 49 of the differential aamplifier 47 are connected to the input of a servo amplifier 50 controlling, through conductors 51 and 52, the servo motor 19 in a conventional manner.

It will be assumed that initially the shaft 15a is at rest with the photocells 25 and 26 focused on the illuminated shaft 15 at points designated a and b on the indicia 16, shown in expanded form in Figure 3. In particular, the spacing of dark lines is reduced in both directions from a center line 16a so that on the ends of the pattern of indicia 16, which will be disposed on the bottom of the shaft 15 180 degrees displaced from the line 16a, the lines are closest together. Of course, the pattern may be revised to provide light lines on a dark background. Moreover, other similar indicia affording varying light intensities therealong could be employed. For example, series of light or dark dots on dark or light backgrounds, respectively, graduated patterns fading from light to dark, and other similar indicia could be used.

It may be desirable to provide a hood over the light source and photocells to minimize the effects of stray light. In other circumstances, such as where the light level remains constant, the source 23 may be omitted.

With the cells 25 and 26 focused on points a and b as shown in Figure 3, each receives the same amount of light so that a balanced input will be furnished to the differential amplifier 47 and the servo motor 19 will be inoperative. Assuming next a slight initial movement of the shaft 15a in a clockwise direction, the photocell 25 will receive less light and the photocell 26 more light, thereby resulting in a voltage unbalance on the conductors 41 and 43 with respect to ground. The resulting output signal from the differential amplifier 47 will cause the servo amplifier 50 to drive the servo motor 19 in a direction to restore a balanced input to the differential amplifier 47 or, in other words, the spur ring gear 21 will be driven in a clockwise direction to impart clockwise movement to the inner bearing race 12, thereby minimizing relative rotation between the races 12 and 14. Only a slight movement of the shaft 15, determined by the sensitivity of the servo system, is required before the inner race 12 commences its movement in synchronism with the shaft 15 which, of course, minimizes friction losses between the central race 14 and the outer race 12.

Figure 5:
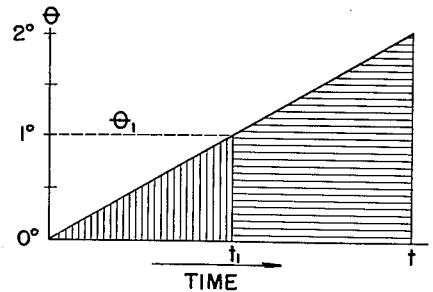
Figure 5 is a curve illustrating the reduction in friction losses in a bearing embodying the inventive principles.

Reference to the curves of Figures 4 and 5 will clarify the reduction in friction losses afforded by the present invention. Figure 4 shows in graphic form rotation of a shaft through an angle $\theta$ of 2° during a time $t$. The area proportional to the energy lost in the bearing is found by the formula (1) $$E = T\theta t$$

in which T is applied torque. Therefore, the shaded area under the curve is proportional to the energy lost in the bearing.

Figure 5 represents a similar energy relationship. The formula (2) $$E = T\theta_n t_1 + E_s$$

expresses an energy relationship in the inventive bearing in which $E_s$ represents energy inserted by the servo system, $\theta_n$ represents the null width angle of the servo system, and $t_1$ represents the time necessary to turn the input shaft through the null width angle. If it is assumed that the same input motion is imparted to the independently rotated shaft as indicated in Figure 4, energy requirements from the shaft will be the same in Figures 4 and 5 to time $t_1$. At that point, as shown in Figure 5, the servo system develops an error signal of sufficient magnitude to drive the bearing and minimize relative motion between the independently rotatable shaft and bearing.

The cross hatched area of Figure 5 indicates that portion of the frictional loss supplied by the servo system. Comparison of the areas vertically shaded in Figures 4 and 5 demonstrate the reduction in bearing losses achieved through use of the inventive bearing. Of course, the particular example set forth is illustrative only and frictional losses can be reduced by a greater or lesser extent than the amount shown.

Figure 6:
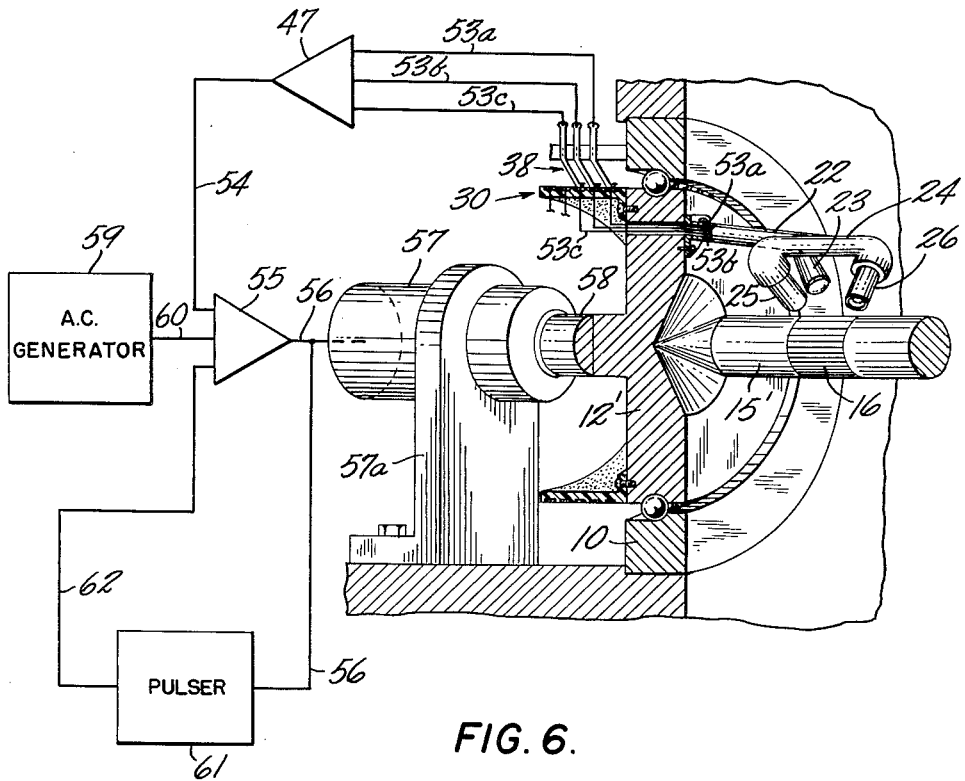
Figure 6 shows low friction bearing apparatus incorporating additional features to reduce static friction effects to a minimum in accordance with the invention.

Figure 6 illustrates in diagrammatic form a further embodiment of the invention similar to that of Figures 1 and 2 but incorporating several additional features. An inner race 12' receives a pointed shaft 15' on which the indicia 16 is provided. The photocells 25 and 26 focused on the indicia 16 transmit signals along lines 53a, 53b and 53c to the differential amplifier 47, in a manner similar to that described in connection with Figures 1 and 2. A cable 54 couples the differential amplifier 47 to one input of an amplifier 55 having its output connected to a cable 56 to energize a servo motor 57 positioned by a support 57a. A shaft 58 couples the motor 57 to the inner race 12' and it will be understood that such coupling may be through suitable gears. The amplifier 55 may be adjusted to provide zero output signals in response to signals on the cable 54 representative of the focusing of the cells 25 and 26 on selected points such as points a and b of the indicia shown in Figure 3.

In either of the embodiments of Figures 2 and 6, modified indicia may be used, such modified indicia being similar to one-half of the pattern 16 shown in Figure 3 with a single photocell initially focused, for example, at point a. The system would then be so arranged that with the output of the cell representative of the light conditions found at point a, no energy would be supplied to the inner race 12 or 12'.

It is known that the friction between two surfaces is slightly greater just before motion begins than when the surfaces are in steady relative motion. Such static friction effects may be greatly reduced by dithering the inner race 12'. To effect such dithering, a low frequency A.-C. generator 59 supplies signals through a line 60 to an input of the amplifier 55. A summing network in the amplifier 55 may be used to combine the signals on the inputs so that the output on the line 56 has a varying signal component causing to and fro motion of the motor 57 and dithering of the bearing race 12'. Therefore, initial frictional effects are further reduced between the shaft 15' and the bearing almost to the value of dynamic friction losses rather than static plus dynamic friction losses.

Inherent in every servo system is a null width, dependent on the sensitivity of the system, through which a control element must be displaced to initiate operation of the servo motor. If the shaft 15' is rotated in a clockwise direction, when it is stopped the servo system will fail to rotate the inner rate 12' through the same angular distance by an amount equal to the null width of the servo system. If the shaft 15 is subsequently rotated in a counterclockwise direction, movement through an angular distance equal to double the servo null width will be required before the race 12' is rotated to minimize movement between the shaft and bearing and thereby reduce friction losses.

To reduce the effects of servo null width and provide equalized friction losses when initiating movement of the shaft 15' in either direction, a pulser 61 receiving signals from the output line 56 is effective to furnish pulses on the line 62 to another input of the amplifier 55 to compensate for the servo null width of the servo system. Thus, a signal to provide for a small increment of rotation of the input shaft 15', which does not generate sufficient signal strength for correction by the servo motor 57, is reinserted into the amplifier 55 to cause a slight additional movement of the servo motor a short interval after the termination of any rotary operation of the shaft 15'. In other words, an incremental energy pulse is supplied to the servo motor 57 to correct positioning errors resulting from limitations of the conventional servo loop. This feature reduces frictional losses in systems wherein motion is of an erratic nature with appreciable periods of rest.

Figure 7:
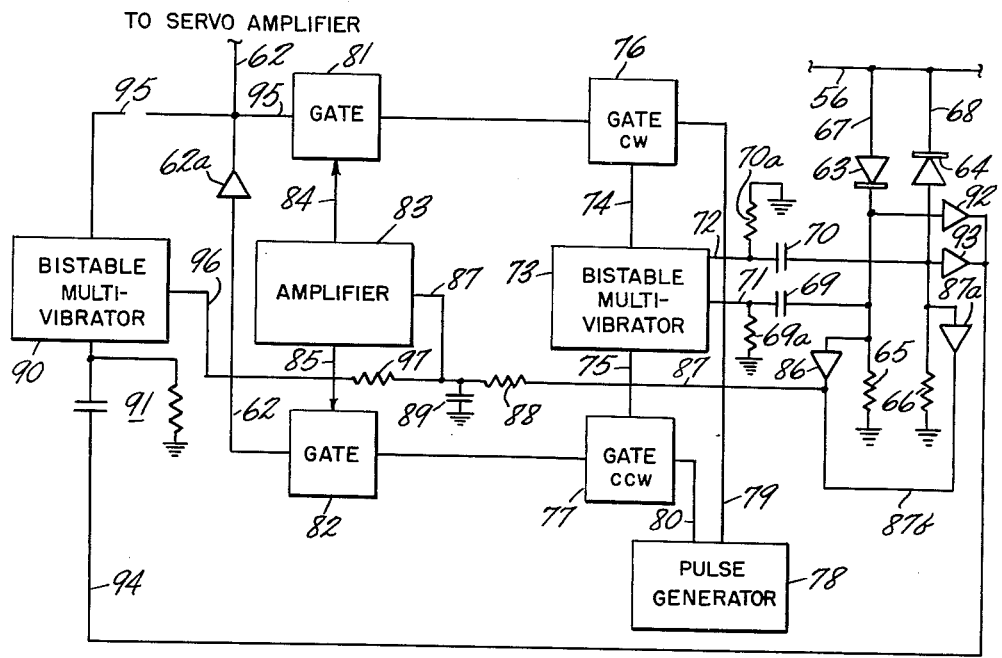
Figure 7 is a schematic diagram, partially in block form, showing in greater detail certain circuits used in the embodiment of Figure 6.

The pulser 61 of Figure 6 may incorporate, for example, the circuits shown schematically and partially in block form in Figure 7. A pair of oppositely polarized diode detectors 63 and 64, respectively connected to ground through load resistors 65 and 66, are joined to the line 56 by conductors 67 and 68, respectively. Thus, either positive or negative control voltages, necessary to rotate the servo motor 57 in two directions, will be detected.

Capacitors 69 and 70 form with resistors 69a and 70a differentiating circuits to supply through conductors 71 and 72 pulses of a polarity indicative of the direction of rotation of the servo motor 57. Thus, assuming positive voltage on the line 56 to rotate the servo motor clockwise, a negative pulse will be developed by the R-C differentiator 69, 69a and provided on the line 71 to switch a bistable multivibrator 73 to provide positive and negative potentials on output lines 74 and 75 to open and close clockwise and counterclockwise gates 76 and 77, respectively. A continuously operating source of timed pulses 78 supplies pulses of opposite polarity to the gates 76 and 77 through lines 79 and 80, respectively. Each of the pulses generated by the source 78 is of such amplitude and duration that after passing through circuits to be described herein, they will be effective to cause movement of the shaft 15' through an angular distance equal to the servo null width.

In the event an A.-C. servo system is used, and the phase of an A.-C. voltage on the line 56 is varied to control the servo motor 57, a phase detector may be interposed between the line 56 and the leads 67 and 68. With that arrangement, rotation of the servo motor in one direction would provide A.-C. energy on one of the lines 67 and 68 which could be detected and used to trigger the bistable multivibrator in the same manner as described above.

The gates 76 and 77 determine the polarity of the pulses coupled from the pulse generator 78 to cause rotation of the shaft 15' through the servo system null width. Further gates 81 and 82 operate a short interval after cessation of shaft movement and are timed to couple a single pulse to the amplifier 55 by an amplifier 83 through conductors 84 and 85, respectively. In particular, a voltage on the line 56 sensed by the detector 63 is coupled to the amplifier 83 through an inverting amplifier 86 and a conductor 87 in which is provided an R-C integrating network, delaying operation of the amplifier 83 for a short interval, for example .5 to 1 second, and formed by a resistor 88 and a capacitor 89. A voltage on the line 56 sensed by the detector 64 is coupled to the amplifier 83 through a buffer amplifier 87a, which does not invert the input signal, a conductor 87b, the conductor 82, and the integrating network. The amplifier 86 functions to invert the signal so that signals of like polarity, negative in this instance, are coupled to the amplifier 83 from the detector circuits.

Another bistable multivibrator 90 is connected to be switched from a first to a second condition when furnished a positive pulse from an R-C differentiator 91 in response to amplified detected signals from the detectors 63 and 64, which are coupled thereto through an amplifier 92 (phase inverter) and a buffer amplifier 93 (does not invert signal), respectively, and a conductor 94.

Another input of the bistable multivibrator 90 receives pulses from the gates 81 and 82 through a conductor 95 connected to the output of the gate 81, and the output line 62, a phase inverter amplifier 95a and the conductor 95 from the gate 82. When a pulse is applied to the bistable circuit 90 on the conductor 95, the multivibrator is connected to switch from its second to its first condition and provide a positive output pulse on a line 96 which is effective, after integration by a resistor 97 and the capacitor 89, to cause the amplifier 83 to close or block the gates 81 and 82. The values of the integrating network components 89 and 97 are chosen so that the voltage across the capacitor 89 decays at a rate to close through the amplifier 83 the gates 81 and 82 after a single pulse initiated by the generator 78 has been coupled therethrough to the output conductor 62.

It should be understood that the dithering voltages supplied to the servo motor 57 are below a threshold value necessary to produce signals of sufficient strength to actuate the bistable multivibrators 73 and 90.

In operation, after movement of the shaft 15' in a clockwise direction, a pulse of suitable polarity will be supplied to the input network of the amplifier 55 on the line 62, and the resulting output will be effective to rotate the inner race 12 clockwise by means of the motor 57 an amount equal to the servo null width. It will be apparent that the above-described circuits may also be used with the system of Figures 1 and 2, as may the dithering feature.

Figure 8:
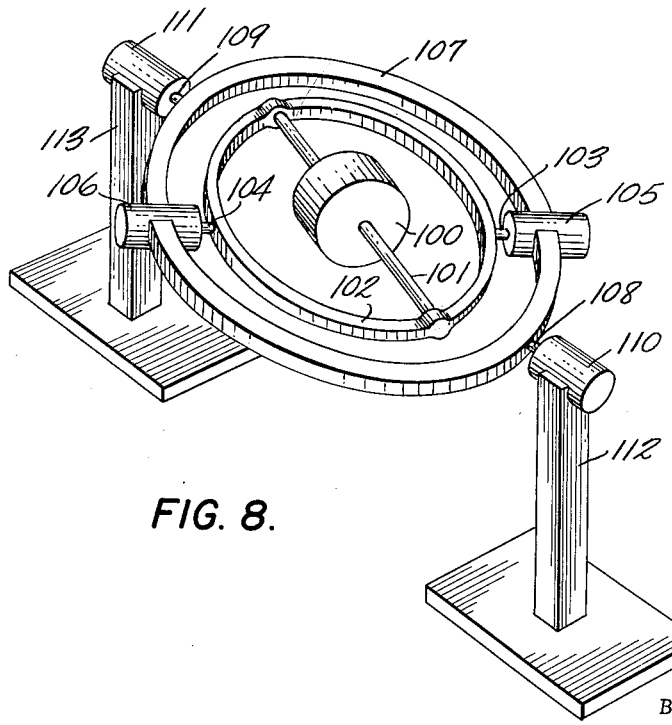
Figure 8 is a view in perspective of a gyroscope journaled in low friction bearings embodying the present invention.

One use for the inventive low friction bearings is illustrated in Figure 8. A gyro 100 is supported by a shaft 101 on a ring 102. Stub axles 103 and 104 are journaled in bearings 105 and 106 constructed in accordance with the invention, those bearings being mounted on a ring 107 carrying stub axles 108 and 109 respectively journaled in further low friction bearings 110 and 111 of the inventive type. Suitable stanchions 112 and 113 support the bearings 110 and 111. The details of each of the bearings 105, 106, 110 and 111 have been omitted in the interests of clarity since they are fully disclosed in Figures 1 to 7, inclusive. It is apparent that the mounting of the gyro 100 by means of the inventive bearings permits gyro action with less inertia and with simplified static balancing.

Obviously, there are innumerable other uses for the low inventive friction bearings in precision instruments, as well as in other applications.

It will be understood that the above-described embodiments of the invention are illustrative only and modifications thereof will occur to those skilled in the art. Therefore, the invention is not to be limited to the specific apparatus disclosed herein but is to be defined by the appended claims.

I claim:

1. Apparatus to reduce bearing friction losses between two relatively rotatable members one of which is independently rotated comprising means journaling the other of the members for rotary movement, sensing means and means cooperating with said sensing means carried by said members to generate error signals representative of relative rotation between said two members, and drive means rotating the other of the members in the direction of rotation of the independently rotated member in response to said error signals to minimize said relative rotation between the two members.

2. Apparatus as defined in claim 1, in which means to provide dithering movement of the other member reduces static friction between the members.

3. Apparatus as defined in claim 1, in which means responsive to said error signals furnishes further signals to the drive means after termination of the error signals to rotate the other member an angular distance compensating for the null width of the error signal generating means and drive means.

4. Apparatus to reduce bearing friction losses between two relatively rotatable members one of which is independently rotated comprising means journaling the other of the members for rotary movement, sensing means mounted on the other of said members, means carried by the one member cooperating with the sensing means to generate error signals in the sensing means upon relative rotation of said members, and drive means responsive to said error signals to rotate the other member in a direction to minimize said relative rotation.

5. Apparatus as defined in claim 4, in which means to provide dithering movement of the other member reduces static friction between the members.

6. Apparatus as defined in claim 4, in which means responsive to said error signals furnishes further signals to the drive means after termination of the error signals to rotate the other member an angular distance compensating for the null width of the error signal generating means and drive means.

7. Apparatus to reduce bearing friction losses between two relatively rotatable members one of which is independently rotated comprising means journaling the other of the members for rotary movement, photosensitive means mounted on the other of said members, indicia on the one member cooperating with the photosensitive means to generate error signals representative of relative rotation between said members, and drive means responsive to said error signals to rotate the other member in the direction of rotation of said one member to minimize said relative rotation.

8. Apparatus as defined in claim 7, in which means to provide dithering movement of the other member reduces static friction between the members.

9. Apparatus as defined in claim 7, in which means responsive to said error signals furnishes further signals to the drive means after termination of the error signals to rotate the other member an angular distance compensating for the null width of the error signal generating means and drive means.

10. Apparatus to reduce bearing friction losses between two relatively rotatable members one of which is independently rotated comprising means journaling the other of the members for rotary movement, a pair of balanced photosensitive cells mounted on the other of said member, indicia on the one member cooperating with the photosensitive cells to cause unbalanced outputs as a function of the relative rotation of the two members, means responsive to said unbalanced outputs to generate error signals representative of relative rotation of said members, and drive means responsive to said error signals to rotate the other member in the direction of rotation of said one member to minimize said relative rotation.

11. Apparatus as defined in claim 10, in which means to provide dithering movement of the other member reduces static friction between the members.

12. Apparatus as defined in claim 10, in which means responsive to said error signals furnishes further signals to the drive means after termination of the error signals to rotate the other member an angular distance compensating for the null width of the error signal generating means and drive means.

13. Apparatus to reduce bearing friction losses between two relatively rotatable members one of which is independently rotated comprising means journaling the other of the members for rotary movement, a pair of balanced photosensitive cells, a light source adjacent said cells, indicia on the one member illuminated by the light source, the photosensitive cells being responsive to light from the indicia to generate output signals as a function of relative rotation of the members, means responsive to said output signals to generate error signals representative of the relative rotation of the members, and drive means responsive to said error signals to rotate the other member in the direction of rotation of said one member to minimize said relative rotation.

14. Apparatus as defined in claim 13, in which means to provide dithering movement of the other member reduces static friction between the members.

15. Apparatus as defined in claim 13, in which means responsive to said error signals furnishes further signals to the drive means after termination of the error signals to rotate the other member an angular distance compensating for the null width of the error signal generating means and drive means.

16. Apparatus to reduce bearing friction losses between two relatively rotatable members one of which is independently rotated comprising an outer stationary bearing race, an inner bearing race member supported by the outer race and relatively rotatable therewith, means to journal a central member in the inner race to provide for relative rotation between the inner race member and the central member, means to drive one of the inner race and central members, an independently rotated shaft connected to the other of said inner race and central members, sensing means generating error signals in response to relative rotation between said inner race and central members, and means to energize the drive means in accordance with the error signals to rotate the one member in the direction of rotation of the other independently rotated member to minimize the relative rotation.

17. Apparatus to reduce bearing friction losses comprising an outer stationary bearing race, an inner bearing race supported by the outer race and relatively rotatable therewith, a central bearing race journaled in the inner bearing race, means to drive the inner bearing race, an independently rotatable shaft affixed to the central race, photosensitive means mounted on the inner bearing race, indicia on the shaft cooperating with the photosensitive means to generate error signals representative of relative rotation between the inner race and the shaft, and means to energize the drive means in accordance with the error signals to rotate the inner race in the direction of rotation of the shaft to minimize said relative rotation.

18. Apparatus as defined in claim 17, in which means to provide dithering movement of the inner race reduces static friction between the inner race and the shaft.

19. Apparatus as defined in claim 17, in which means responsive to said error signals furnishes further signals to the drive means after termination of the error signals to rotate the inner race an angular distance compensating for the null width of the error signal generating means and drive means.

References Cited in the file of this patent

UNITED STATES PATENTS

| | | |
|---|---|---|
| 2,262,361 | Gulliksen | Nov. 11, 1941 |
| 2,469,782 | Phair | May 10, 1949 |
| 2,472,824 | Hays | June 14, 1949 |
| 2,517,556 | Goertz | Aug. 8, 1950 |
| 2,532,723 | Knoop | Dec. 5, 1950 |
| 2,577,942 | Agins | Dec. 11, 1951 |
| 2,819,053 | Pope | Jan. 7, 1958 |